US011229091B2

(12) United States Patent
Saad et al.

(10) Patent No.: US 11,229,091 B2
(45) Date of Patent: Jan. 18, 2022

(54) CONTINUOUS RESISTANCE AND PROXIMITY CHECKING FOR HIGH POWER DEICING AND DEFOGGING SYSTEMS

(71) Applicant: BETTERFROST TECHNOLOGIES, INC., Toronto (CA)

(72) Inventors: Sameh M. I. Saad, Hamilton (CA); Kazi Ahmed, Toronto (CA)

(73) Assignee: Betterfrost Technologies, Inc., Toronto (CA)

( * ) Notice: Subject to any disclaimer, the term of this patent is extended or adjusted under 35 U.S.C. 154(b) by 296 days.

(21) Appl. No.: 15/993,219

(22) Filed: May 30, 2018

(65) Prior Publication Data

US 2019/0373681 A1 Dec. 5, 2019

(51) Int. Cl.
*H05B 3/84* (2006.01)
*B64D 15/12* (2006.01)

(52) U.S. Cl.
CPC .................................... *H05B 3/84* (2013.01)

(58) Field of Classification Search
CPC ................ H05B 3/84; B32B 17/10394; B23B 17/10403
USPC .......................................................... 219/203
See application file for complete search history.

(56) References Cited

U.S. PATENT DOCUMENTS 3,968,342 A * 7/1976 Inaba .................. G01N 27/121 219/203
4,032,745 A * 6/1977 Roselli .................. G05D 22/02 219/203
4,422,077 A * 12/1983 Kropielnicki ............ H01Q 1/44 343/704
4,565,919 A * 1/1986 Bitter ................ B32B 17/10036 219/203
4,613,802 A 9/1986 Kraus et al.
4,829,163 A * 5/1989 Rausch ............. B32B 17/10036 219/203
4,847,472 A * 7/1989 Koontz ............. B32B 17/10192 219/543
4,894,514 A * 1/1990 Delvin .............. B32B 17/10036 219/203
4,902,875 A * 2/1990 Koontz ............. B32B 17/10036 219/203
4,904,844 A 2/1990 Chamberlin
RE33,343 E * 9/1990 Bitter ....................... H02H 5/10 219/203
5,040,411 A 8/1991 Medzius
5,496,989 A 3/1996 Bradford et al.
5,668,478 A 9/1997 Buschur (Continued)

FOREIGN PATENT DOCUMENTS

CN 204222593 U * 3/2015 ........... H05B 1/0236
EP 1648200 B1 * 12/2007 ........... H05B 1/0236

*Primary Examiner* — Robert J Utama
*Assistant Examiner* — Lawrence H Samuels
(74) *Attorney, Agent, or Firm* — Kramer Amado, PC

(57) ABSTRACT

A safety method and system consisting of resistance checking for use with high power deicing and defogging systems, including high power deicing and defogging systems for windshields and including quasi-continuous checking with pulse-electro thermal deicing and defogging systems, is disclosed. The resistance checking system may be combined with a proximity detector safety system which operates in conjunction with the resistance based safety system.

15 Claims, 7 Drawing Sheets

(56) References Cited

U.S. PATENT DOCUMENTS

| | | | | | |
|---|---|---|---|---|---|
| 5,672,976 | A * | 9/1997 | Egger | B60S 1/0822 219/203 |
| 5,682,788 | A | 11/1997 | Netzer | |
| 5,780,719 | A | 7/1998 | Vandam | |
| 5,880,538 | A | 3/1999 | Schulz et al. | |
| 6,020,576 | A * | 2/2000 | Shiah | G01K 1/14 219/501 |
| 6,094,981 | A | 8/2000 | Hochstein | |
| 6,262,410 | B1 | 7/2001 | Stam et al. | |
| 6,373,263 | B1 | 4/2002 | Netzer | |
| 6,794,882 | B2 * | 9/2004 | Jessup | B60R 25/1004 219/509 |
| 6,870,139 | B2 * | 3/2005 | Petrenko | A63C 1/30 219/482 |
| 7,087,876 | B2 | 8/2006 | Petrenko | |
| 8,109,141 | B2 | 2/2012 | Veerasamy | |
| 8,921,739 | B2 | 12/2014 | Petrenko et al. | |
| 9,234,983 | B2 | 1/2016 | Sugiura et al. | |
| 10,739,292 | B1 * | 8/2020 | Melcher | H05B 3/18 |
| 2003/0155467 | A1 * | 8/2003 | Petrenko | A63C 5/06 244/134 R |
| 2007/0194216 | A1 * | 8/2007 | Schwenke | H05B 1/0236 250/221 |
| 2011/0024408 | A1 * | 2/2011 | Wei | H05B 3/84 219/260 |
| 2012/0234816 | A1 * | 9/2012 | Petrenko | H05B 1/0236 219/203 |
| 2017/0034875 | A1 * | 2/2017 | Weber | B32B 17/10192 |
| 2020/0196392 | A1 * | 6/2020 | Seki | B60H 1/22 |

* cited by examiner

CONTINUOUS RESISTANCE AND PROXIMITY CHECKING FOR HIGH POWER DEICING AND DEFOGGING SYSTEMS

TECHNICAL FIELD

This invention relates to a safety method and system consisting of resistance checking for use with high power deicing and defogging systems, including high power deicing and defogging systems for windshields and including quasi-continuous resistance checking with pulse-electro thermal deicing and defogging systems. The resistance checking system may be combined with a proximity detector safety system which operates in conjunction with the resistance based safety system.

BACKGROUND

Transparent windshields for various vehicles, such as cars, rail vehicles including trains, streetcars and locomotives, snowmobiles, airplanes, helicopters and sea vessels, must be defrosted or defogged using available on-board power. Typically, defrosting and defogging are accomplished by blowing air heated by the vehicle's engine onto the windshield. However, especially since the engine is initially cold upon startup, defrosting/defogging can take a considerable amount of time.

To deice a windshield in less than thirty seconds, a high power (typically greater than 3 kW) can be applied to an electrically heated windshield. Common 12V DC power sources, found in most commercial and passenger vehicles, are able to deliver up to 10 kW of power but only into extremely low resistance loads, such as 0.01 ohms. A conductive film windshield heater, to be sufficiently transparent for practical use, typically has a resistance of over 1 ohm (generally, the less the resistance in the conductive film, the less transparency), Thus, traditional 12V power sources are unable to meet the requirements of a rapid windshield deicing system with a transparent windshield heater.

A windshield deicing system was previously introduced using pulse-electro thermal deicing (PETD) as disclosed in U.S. Pat. Nos. 8,921,739 and 6,870,139. Such a system provides a high density of heating power ($W/m^3$) which allows for rapid and energy-efficient deicing. Rapid heating insures that only a thin, or boundary, layer of ice (e.g. between 1 μm and 1 mm) at the ice/windshield interface need be heated to the ice melting point. In one embodiment, windshield heaters are continuous film metal-oxide transparent coatings made of indium-tin-oxide (ITO), zinc-oxide, tin-oxide or any other electrically conductive, transparent, film made of a single metal oxide or a composite of several metal oxides. In another embodiment, windshield heaters are thin optically transparent metal films made of silver, aluminum, gold or the like, or of an electrically conductive and optically transparent polymer material.

SUMMARY

Generally, high power heaters in a deicing system in a window or windshield are surrounded by a layer of glass or a dielectric later, and so cannot be touched. However, the window or windshield may be damaged internally or externally and not repaired or maintained, (for example, in consumer uses such as for passenger cars, normal use may lead to chips in the windshield) resulting in either exposure of the heaters or internal damage to the heaters and/or busbars. Exposure of the heaters and/or busbars creates a situation where someone touching the heaters during the deicing process could be injured. In addition, internal damages to the heaters and/or busbars can create unsafe situations during the deicing operation that need to be detected and hence avoided.

This patent discloses a safety protection system for use with a high power deicing and defogging system that tests the resistance of the windshield system prior to and during deicing and defogging operations to guard against unsafe operation, safely and cost-effectively, by pulsing the high power system. In addition, a proximity sensor (e.g. based on capacitance) can be used to include an additional layer of safety by detecting if a person (or part of person, e.g. finger) is close to the heating apparatus and shutting the system down. The proximity sensor adds an additional layer of safety on top of the resistance checking. For example, if there is a crack or chip in the glass that does not damage the heating apparatus, it may not be detected by the resistance checking. In such a situation, the addition of a proximity sensing system can still shut down the system in case a person or finger is detected near the glass. In addition, when there is a pulsed high power deicing system, the proximity detection can occur simultaneously with the resistance detection between the high power pulses.

Because the PETD system is a high power system, standard inexpensive methods of checking resistance or capacitance cannot be used. However, if a PETD system is pulsed, then a low power pulse with a measurement of resistance and/or capacitance can occur before every high power PETD pulse. In other words, a pulsed PETD system converts the high power for deicing and defogging into many smaller high power pulses, with lower power pulses in between the higher power pulses to measure the resistance and/or capacitance. With a fast enough duty cycle, this simulates continuous resistance measurement using much cheaper and simpler equipment than continuous resistance checking in high power systems. This is particularly useful in the case of windshields, since problems can develop during the deicing process, such as a new chip in the windshield or the widening of a previously-minor crack, all of which would affect the resistance of the system.

In accordance with the present invention, there is provided a method of increasing the safety of a method of heating a surface using a heating system, comprising the steps of: applying heating energy to the surface using the heating system; limiting the duration of the step of applying heating energy to the surface using the heating system; and repeating the steps of applying and limiting in a periodic manner; characterized by the steps of: applying a small pulse of power to sense the resistance across the heating system before each step of applying heating energy, and stopping the method of heating a surface if the resistance is outside a predetermined range, before every repeat of the steps of applying and limiting. In an aspect of this method, the predetermined range is 1-3 ohms. In another aspect of this invention, the predetermined range is 7-20 ohms. In another aspect of this invention, the predetermined range is within a range of at least 1 to at most 20 ohms. In another aspect of this invention, the voltage supplied during the step of applying a small pulse of power to sense the resistance across the heating system is less than 15 Volts. In yet another aspect of this invention, the voltage supplied during the step of applying a small pulse of power to sense the resistance across the heating system is less than 5 Volts. In yet another aspect of this invention, the step of applying a small pulse of power to sense the resistance across the heating system is applied 1 to 20 times per second.

In accord with the present invention, there is provided a method of increasing the safety of a method of heating a surface using a heating system, comprising the steps of: applying heating energy to the surface using the heating system; limiting the duration of the step of applying heating energy to the surface using the heating system; and repeating the steps of applying and limiting in a periodic manner; characterized by the steps of: applying a step of applying a first small pulse of power to sense the resistance across the heating system, and stopping the method of heating if the resistance is outside a predetermined range, before every repeat of the steps of applying and limiting; and applying a step of applying a second small pulse of power to sense the capacitance across the heating system, and stopping the method of heating if the capacitance is above a predetermined threshold, before every repeat of the steps of applying and limiting. In an aspect of this method, the first and the second pulses are the same pulse. In an aspect of this method, the predetermined range is 1-3 ohms. In another aspect of this invention, the predetermined range is 7-20 ohms. In another aspect of this invention, the predetermined range is within a range of at least 1 to at most 20 ohms. In another aspect of this invention, the voltage supplied during the step of applying a small pulse of power to sense the resistance across the heating system is less than 15 Volts. In yet another aspect of this invention, the voltage supplied during the step of applying a small pulse of power to sense the resistance across the heating system is less than 5 Volts. In yet another aspect of this invention, the step of applying a small pulse of power to sense the resistance across the heating system is applied 1 to 20 times per second.

In accordance with the present invention, there is provided a method of increasing the safety of a method of heating a surface using a heating system, comprising the steps of: applying heating energy to the interface using the heating system; limiting the duration of the step of applying heating energy to the interface using the heating system; and repeating the steps of applying and limiting in a periodic manner; characterized by the steps of: applying a step of applying a small pulse of power to sense the capacitance across the heating system, and stopping the method of heating if the capacitance is above a predetermined threshold, before every repeat of the steps of applying and limiting.

In accordance with the present invention, there is provided a system for heating a surface, comprising: a first power supply for generating power; a heating apparatus that is within the surface or in contact with the surface and that is coupled to the first power supply, to convert the power into heat at the surface; and a controller coupled to the first power supply to periodically apply power to the heating apparatus; where the heating apparatus comprises at least a heating element and at least two busbars; characterized by: a second power supply for generating power; a second controller; a resistance detector; the resistance detector being configured to measure resistance across the heating apparatus; the second controller being coupled to the second power supply and the resistance detector to periodically apply power to the resistance detector, and the second controller, first controller and first power source configured so if the resistance detected by the resistance detector is outside a predetermined range, power from the first power supply cannot be applied to the heating apparatus; where power is applied to the resistance detector before power is applied from the first power source to the heating element; and where the power applied to the resistance detector is turned off before power from the first power source is applied to the heating apparatus. In an aspect of this system, the second power source is the first power source, stepped down to supply less power. In another aspect of this system, the first and second controller are the same controller.

In accordance with the present invention, there is provided a system for heating a surface, comprising: a first power supply for generating power; a heating apparatus that is within the surface or in contact with the surface and that is coupled to the first power supply, to convert the power into heat at the surface; and a controller coupled to the first power supply to periodically apply power to the heating apparatus; where the heating apparatus comprises at least a heating element and at least two busbars; characterized by: a second power supply for generating power; a second controller; a resistance detector; a capacitance detector; the resistance detector being configured to measure resistance across the heating apparatus and the capacitance detector being configured to measure capacitance across the heating apparatus; the second controller being coupled to the second power supply and the resistance detector and the capacitance detector to periodically apply power to the resistance detector and the capacitance detector, and the second controller, the first controller and the first power source configured so if the resistance detected by the resistance detector is outside a predetermined range or the capacitance detected by the capacitance detector is higher than a predetermined threshold, power from the first power source cannot be applied to the heating apparatus; where power is applied to the resistance detector and the capacitance detector before power is applied from the first power source to the heating apparatus; and where the power applied to the resistance detector and the capacitance detector is turned off before power is applied from the first power source to the heating apparatus. In an aspect of this system, the second power source is the first power source, stepped down to supply less power. In another aspect of this system, the first and second controller are the same controller.

In accordance with the present invention, there is provided a system for heating a surface, comprising: a first power supply for generating power; a heating apparatus that is within the surface or in contact with the surface and that is coupled to the first power supply, to convert the power into heat at the surface; and a controller coupled to the first power supply to periodically apply power to the heating apparatus; where the heating apparatus comprises at least a heating element and at least two busbars; characterized by: a second power supply for generating power; a second controller; a capacitance detector; the capacitance detector being configured to measure capacitance across the heating apparatus; the second controller being coupled to the second power supply and the capacitance detector to periodically apply power to the capacitance detector, and the second controller, the first controller and the first power source configured so if the capacitance detected by the capacitance detector is higher than a predetermined threshold, power cannot be applied from the first power source to the heating apparatus; where power is applied to the capacitance detector before power is applied from the first power source to the heating apparatus; and where the power applied to the capacitance detector is turned off before power is applied from the first power source to the heating apparatus. In an aspect of this system, the second power source is the first power source, stepped down to supply less power. In another aspect of this system, the first and second controller are the same controller.

BRIEF DESCRIPTION OF THE DRAWINGS

In order to better understand various exemplary embodiments, reference is made to the accompanying drawings, wherein.

DETAILED DESCRIPTION

Figure 1:
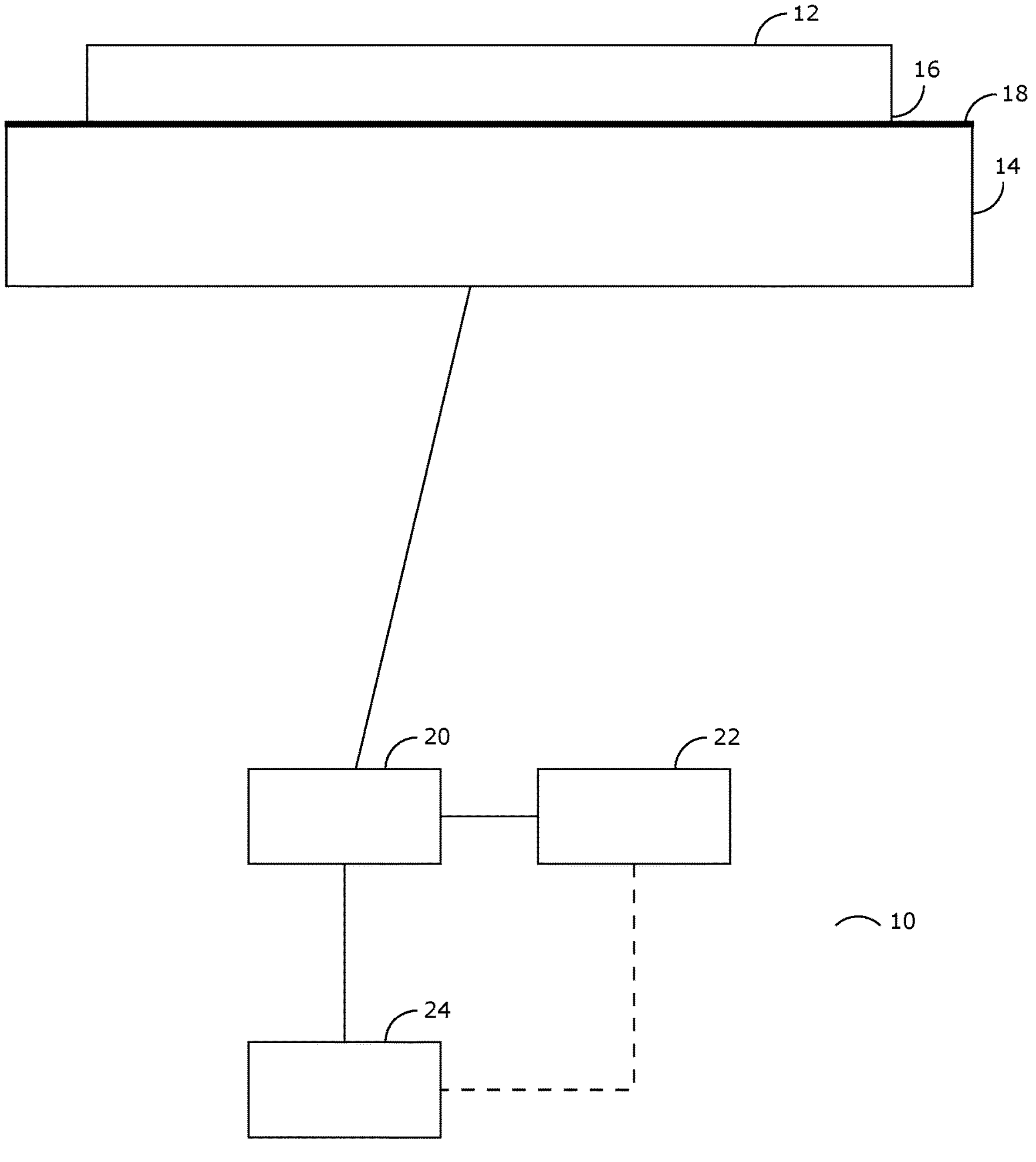
FIG. 1 is an illustration of a high power deicing and defogging system.

FIG. 1 is an illustration of a high power deicing and defogging system. Turning to FIG. 1, there is a high power deicing and defogging system 10 for melting ice 12 on an object 14 along a surface which in this figure is an interface 16 between the ice 12 and object 14. The high power deicing and defogging system 10 includes a heating element 18, a switch 20, a controller 22 and a power supply 24. In operation, the power supply 24 supplies power to the heating element 18, which melts the interfacial ice at 16. The high power deicing and defogging system 10 is turned on and off through the actions of controller 22 and switch 20.

A pulse-electro thermal deicer or PETD system improves the high power deicing and defogging system 10 by limiting the amount of power applied and the duration of the application of the power to the amounts sufficient to melt a thin layer of interfacial ice at 16. In a PETD system, the application of power to the heating element 18 and its duration, including any pulsing, is controlled by switch 20 and controller 22. In the preferred embodiment, the application of power is pulsed.

While this system is described and discussed in this application as a deicing system, it will be appreciated by those skilled in the art that such a system will also function as a defogging system.

In practice, if the object to be deiced is a window or a windshield, the window or windshield takes the form of a number of transparent layers which include one or more heating elements.

Figure 2A:
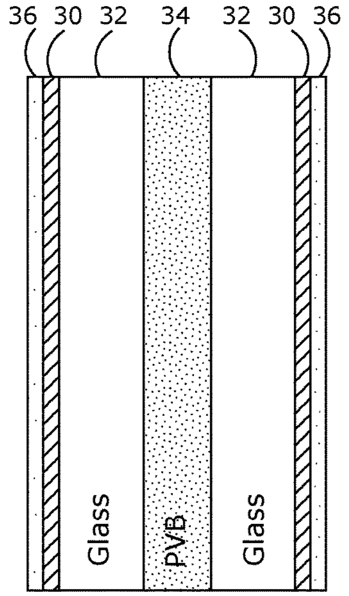
FIG. 2A is an illustration of cross-sectional views of a first type of windshields (or, more broadly, transparent windows) seen in practice.
Figure 2B:
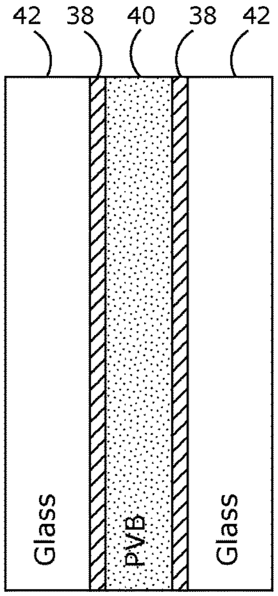
FIG. 2B is an illustration of cross-sectional views of a second type of windshields (or, more broadly, transparent windows) seen in practice.
Figure 2C:
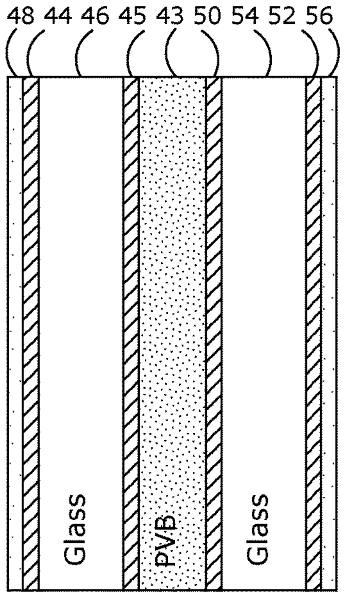
FIG. 2C is an illustration of cross-sectional views of a third type of windshields (or, more broadly, transparent windows) seen in practice.
Figure 2D:
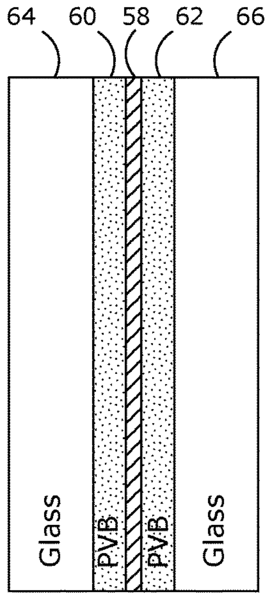
FIG. 2D is an illustration of cross-sectional views of a fourth type of windshields (or, more broadly, transparent windows) seen in practice.
Figure 2E:
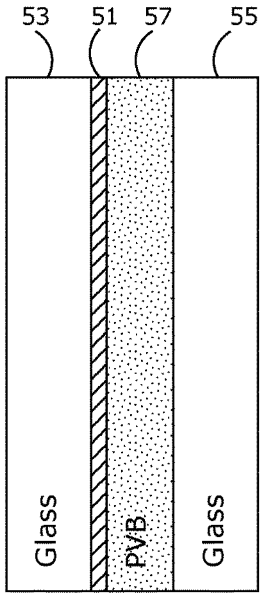
FIG. 2E is an illustration of cross-sectional views of a fifth type of windshields (or, more broadly, transparent windows) seen in practice.
Figure 2F:
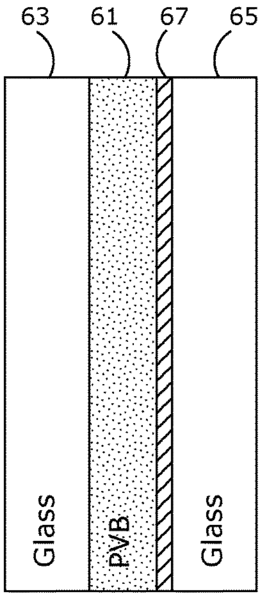
FIG. 2F is an illustration of cross-sectional views of a sixth type of windshields (or, more broadly, transparent windows) seen in practice.

FIGS. 2A-2F illustrate cross-sectional views of some different types of windshields (or, more broadly, transparent windows) seen in practice. Turning to FIG. 2A, in one embodiment, heating elements 30 are disposed on outer surfaces of glass layers 32, which themselves surround a polyvinyl butyral (PVB) shatter-resistant plastic layer 34, and are covered by dielectric layers 36. Dielectric layers increase safety, as well as provide scratch protection for the heating elements 30. The heating element on the outer glass is used to deice the windshield, and the heating element on the inner glass is used to defog the windshield. Turning to FIG. 2B, in another embodiment, heating elements 38 are disposed between a polyvinyl butyral (PVB) shatter-resistant plastic layer 40 and glass layers 42. The heating elements close to the outer glass deices the windshield, and the heating element close to the inner glass defogs the windshield. FIG. 2C shows another embodiment where a pair of heating elements 44 and 45 are placed in a way to surround the outer glass layer 46 and the outer heating element 44 is covered by a dielectric layer 48. Another pair of heating elements 50 and 52 are placed in a way to surround the inner glass layer 54 and the inner heating element 52 is also covered by a dielectric layer 56. PVB layer 43 lies between heating elements 45 and 50. FIG. 2D shows another embodiment where a heating element 58 is placed between two layers 60 and 62 of polyvinyl butyral (PVB) shatter-resistant plastic which are surrounded by glass layers 64 and 66. FIG. 2E shows another embodiment where a heating element 51 is placed between a polyvinyl butyral (PVB) shatter-resistant plastic layer 57 and an outer glass layer 53. The heating element can be used to deice the outer glass layer 53 and defog the inner glass layer 55. FIG. 2F shows another embodiment where a heating element 67 is placed between a polyvinyl butyral (PVB) shatter-resistant plastic layer 61 and an inner glass layer 65. The heating element can be used to defog the inner glass layer 65 and deice the outer glass layer 63.

It should be noted that future windshields and windows may be made of safety glass incorporating a shatter-resistant plastic layer of plastics or other material other than PVB.

A person skilled in the art will recognize that FIGS. 2A-2F are illustrative of possible window or windshield constructions, and are not intended to be exhaustive of the types of windows or windshields with which this invention can be used.

Figure 3:
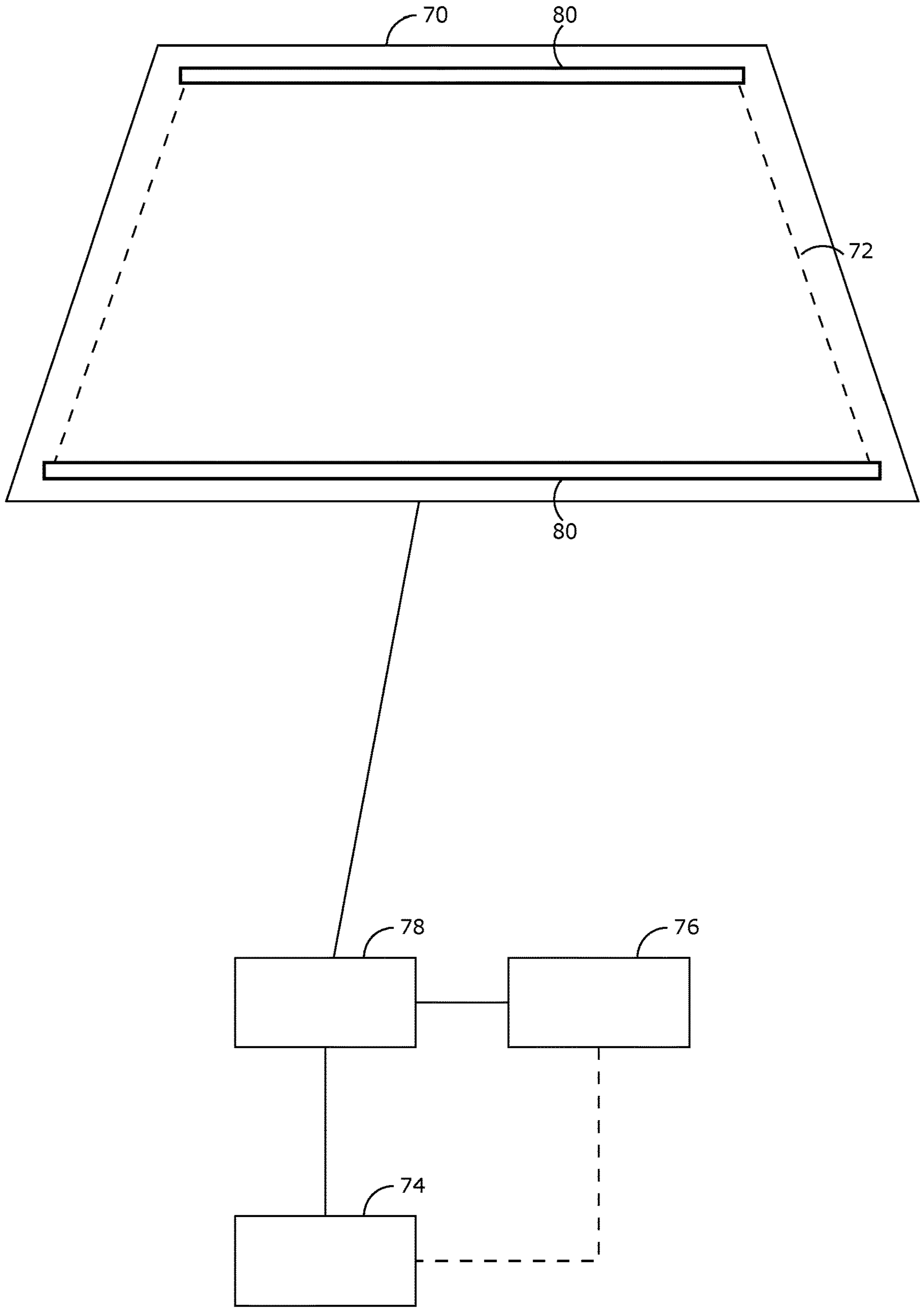
FIG. 3 is a more detailed view of a windshield with a high power deicing and defogging system, including busbars and the conductive layer.

FIG. 3 is a more detailed view of a windshield with a high power deicing system. Turning to FIG. 3, there is a windshield 70 which incorporates a heating element 72. Heating element 72 is transparent. Power for heating element 72 is supplied by a power supply 74, and the supply of power is regulated by controller 76 and switch 78. In practice, heating element 72 will often incorporate several busbars 80, together called the heating apparatus. Although busbars 80 are illustrated in FIG. 3 at the top and bottom of heating element 72, a person skilled in the art will recognize that the busbars could be of varying number and locations around the heating element 72.

The resistance checking subsystem uses a short low power pulse signal before every high power deicing operation to check the total resistance of the system including the transparent conductive layer, the busbars, and wire connections. This detects irregularities in the transparent conductive layer as well as the busbars. Problems that could be detected by this subsystem include cracks or cuts in the transparent conductive layer or one of the busbars.

A short low power pulse signal (before commencing deicing and defogging) is used to detect the total resistance. Comparing the total resistance with a predetermined range that is the allowable error limit on a calibrated resistance value, is used to indicate problems with one of the circuit components. If such problem is detected, the deicing/defogging system is not allowed to operate and an error message could be displayed. The calibrated resistance value is set to reflect the specific windshield and PETD combination.

Figure 4A:
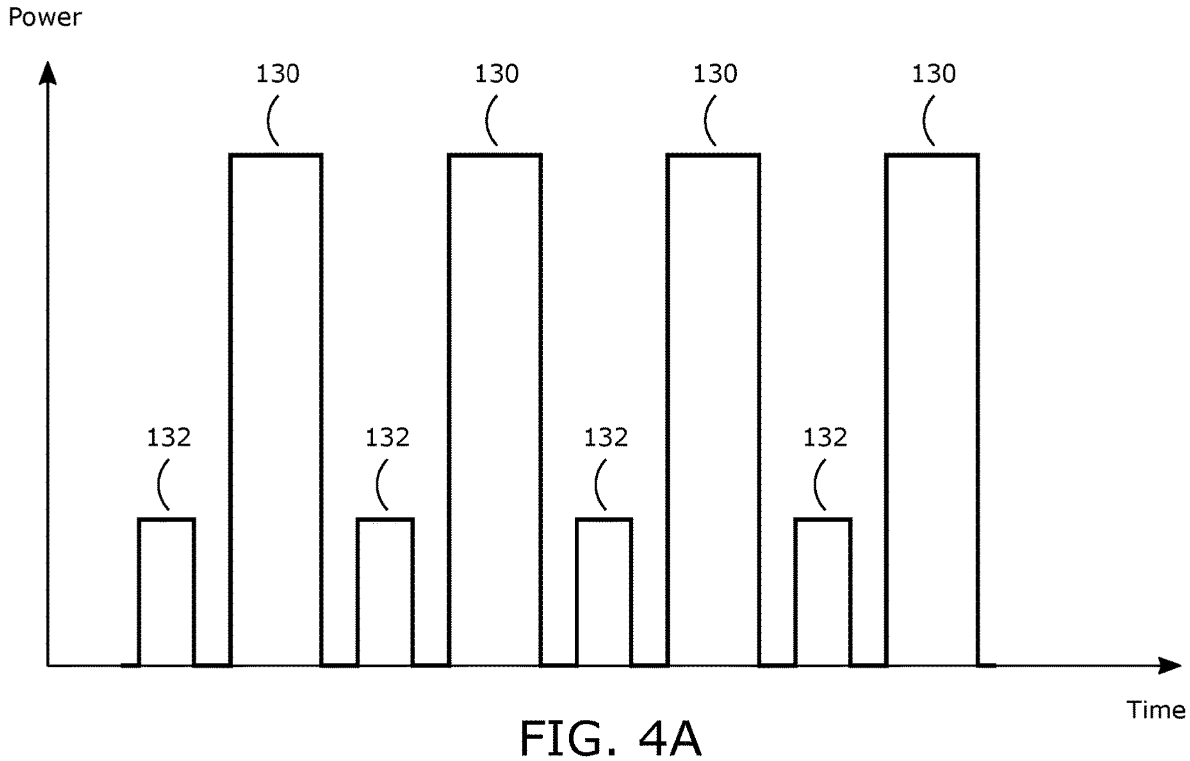
FIG. 4A illustrates the use of multiple low power pulses for use with a pulsed high power deicing system, with one low power pulse between each high power pulse.

To monitor the system during a pulsed defrosting system, the low power pulse would be applied periodically in between the high power pulses in a predetermined duty cycle (for example 1 to 20 pulses per second) to measure for any resistance changes during the application of the PETD pulses. If any resistance outside the predetermined range is detected during a low power pulse, the system is shut off. Turning to FIG. 4A, a pulsed PETD system employs high power pulses 130 at regular intervals. Before each PETD pulse 130, the system tests the resistance of the system through a low power pulse 132.

Notably, applying a short low power pulse signal by alternating it with the high power PETD pulses can detect any issues that develop during the defrost. This is important, since a chip or crack may first occur during the deicing process, or a pre-existing but minor chip or crack may enlarge during a defrost. The alternating low power pulse system can detect such developing problems and shut the system down safely.

It is important to use a lower power pulse instead of the high power defrosting pulse because checking of resistance in high power systems introduces the potential risk of stray current destroying the sensors unless they are expensively insulated—by using low power pulses alternated with high power pulses, the disclosed subsystem can achieve substantially the results of continuous monitoring at a much lower cost and higher level of safety and reliability.

Figure 5:
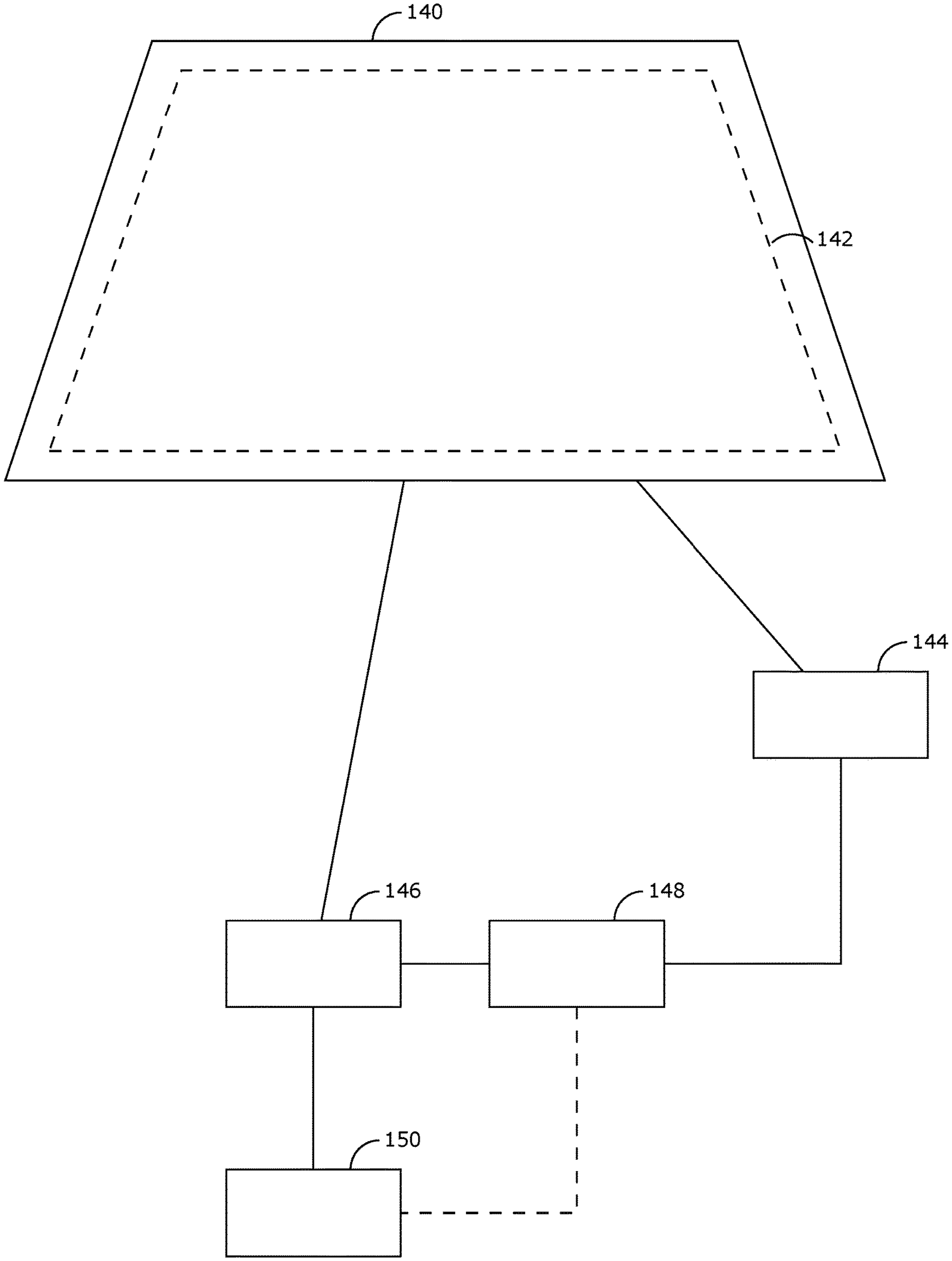
FIG. 5 is a view of a windshield with a high power deicing system and a resistance safety subsystem.

Turning to FIG. 5, there is a window 140 with a heating apparatus 142. Resistance detector 144 is connected to the heating apparatus 142 and a switch 146 and a controller 148 attached to power source 150. When the resistance detector 144 senses a large enough change in resistance, the controller 148 trips the switch 146 and shuts down the high power deicing system, preventing injury.

As persons skilled in the art will realize, there are various configurations of switch 146 and controller 148 that can implement this functionality and fall within the scope of this description. For example, the switch could use solid state relays or mechanical relays or other electronic switches, and the controller could be programmed or hard wired. The resistance sensor can be a separate module, or built directly into the controller. Additional switches, diodes, etc. can be used to isolate the resistance detector and/or controller from the high voltage source further.

The power source for the low power pulse could be the same power source used for the high power deicing but stepped down, or a separate low voltage power source (e.g. a battery) to provide a low current.

In one embodiment, resistance detector 144 uses a differential amplifier or a microprocessor to measure the difference between the current through the apparatus (i.e. the transparent conductive layer, busbars, and wire connections) and another current through a resistor with a total resistance equal to the calibrated system resistance. In another embodiment, resistance detector 144 measures the voltage drop across a known resistor in series connection with heating apparatus 142, thereby calculating the voltage drop and resistance of the heating apparatus. In either embodiment, if the calculated resistance is outside a predetermined range, an electronic switch is opened and the high power deicing system is not allowed to operate.

A person skilled in the art will know that other resistance detectors could be implemented that will have the same functionality as the detector described immediately above.

The predetermined range will reflect the materials used in the specific implementation of the high power deicing system, including the coating for a windshield, and should be set for each specific implementation of a high power deicing system. In one embodiment, the high power deicing and defogging system uses a silver alloy coating for the windshield with a typical sheet resistance between 1 and 2 ohms/sq. For a typical windshield aspect ratio, the predetermined range of acceptable total resistances with this material comes to 1 to 3 ohms. In a second embodiment, the high power deicing and defogging system uses a transparent tin oxide coating for the windshield with a typical sheet resistance between 12 and 16 ohms/sq. For a typical windshield aspect ratio, the predetermined range of acceptable total resistances with this material comes to 7 to 20 ohms. Generally, for most practical application, the predetermined range of acceptable resistances ranges from a lower limit of at least 1 to a higher limit of at most 20 ohms.

In a particular embodiment, where the resistance checking is done through measuring voltage drop across an auxiliary resistance that is the same order of magnitude as the windshield transparent conductive layer, the measured voltage typically depends on the control board used for the measurement, e.g. less than 5 Volts when using a common commercially available control board. Therefore in such an embodiment, the voltage supplied during this resistance detection system is less than 15V.

A high power deicing solution for windows or windshields with enhanced safety systems may use this continuous resistance checking subsystem in combination with one or more additional safety subsystems to better ensure safety.

To add an additional layer of safety to prevent the system from running while a person is near the windshield, a proximity sensor can be used. This can prevent issues from occurring if the insulating layer on top of the heating apparatus is damaged, e.g. a crack in the glass that exposes the heating element to a finger, but causes no damage to the heating apparatus itself that would be detectable with the resistance sensor.

At a high level, proximity detection provides a way for users to interact with electronic devices without having physical contact. Many approaches can be used to detect proximity: magnetic, IR, optical, Doppler effect, inductive, and capacitive. Each method has its own benefits and limitations.

In one embodiment, a capacitive proximity sensor is used. Capacitive sensing method is detecting the change of capacitance on the sensor due to user's touch or proximity. Proximity sensors usually consist of a metal-fill area, used, for example, by placement on a printed circuit board, and the capacitance of the area is measured using a capacitance sensor that detects the change in capacitance of the system as an object with high permittivity (such as a person) comes near. In this embodiment, the windshield itself is the capacitor, with the transparent coating used in the heating element taking the place of the metal fill area. A capacitance sensor is coupled to the heating apparatus, and can measure its capacitance, detecting any changes as would be caused by a nearby person.

A short low power pulse signal (before commencing deicing) is used to detect the system capacitance. Comparing the capacitance with a predetermined threshold that is the allowable error limit on a calibrated capacitance value, is used as indication of a body being near the heating apparatus. If such proximity is detected, the deicing system is not allowed to operate and an error message could be displayed. The calibrated capacitance value is dependent on windshield construction, size, placement, angle, etc., and thus is customized by vehicle.

Figure 4B:
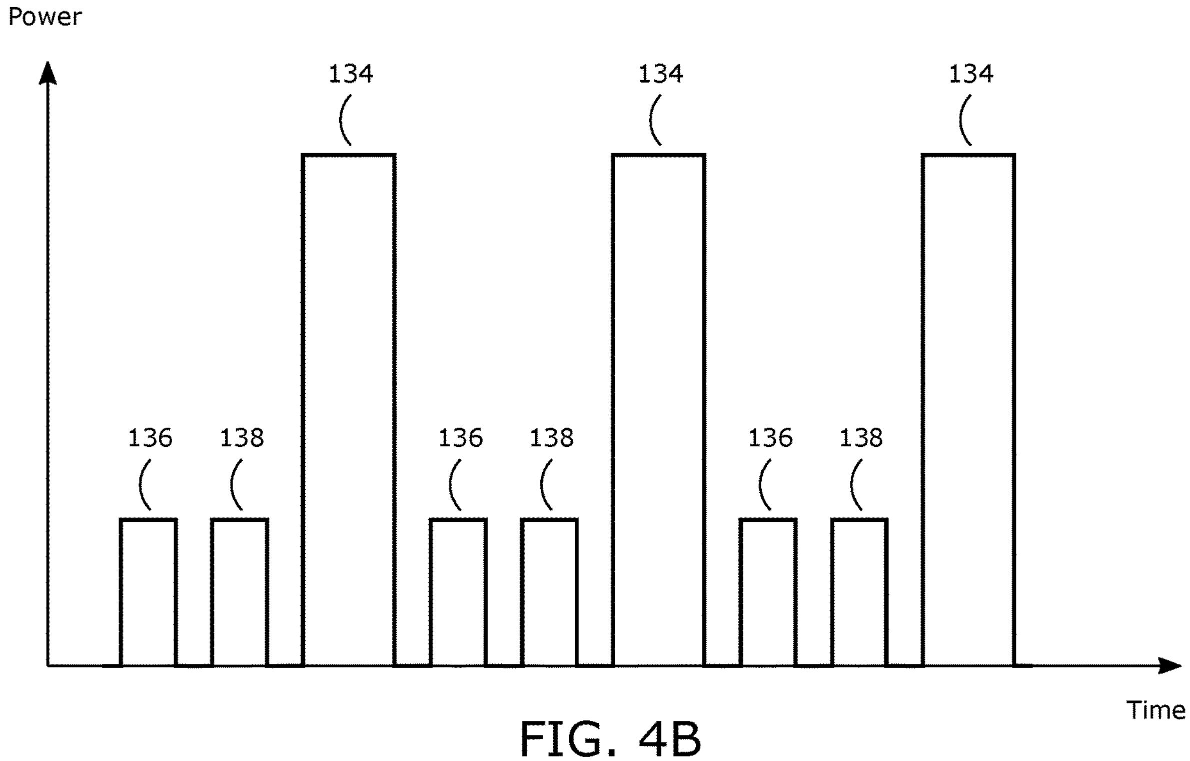
FIG. 4B illustrates the use of multiple low power pulses for use with a pulsed high power deicing system, with two low power pulses between each high power pulse.

To monitor the system during a defrost, the low power pulse would be applied periodically in between the high power pulses in a predetermined duty cycle (for example 1 to 20 low power pulses per second) to measure for any capacitance changes during the application of the high power pulses. If any major changes are detected during a low power pulse, the system is shut off. Turning to FIG. 4B, a pulsed PETD system employs pulses 134 at regular intervals. Before each PETD pulse 134, the system tests the resistance as well as the capacitance of the system through two low power pulses 136 and 138. In another embodiment, a pulsing system similar to the one described in FIG. 4A could also be used to test for both the resistance and the capacitance of the system using a single low power pulse 132 before each PETD pulse 130.

Notably, applying a short low power pulse signal by alternating it with the high power PETD pulses can detect any issues that develop during the defrost. This is important, since a person may approach the windshield while the system is running. The alternating low power pulse system can detect such issues and shut the system down. It is important to use a lower power pulse instead of the high power defrosting pulse because checking of capacitance in high power systems introduces the potential risk of stray current destroying the sensors unless they are expensively insulated—by using low power pulses alternated with high power pulses, the disclosed subsystem can achieve substantially the results of continuous monitoring at a much lower cost and higher level of safety and reliability.

Figure 6:
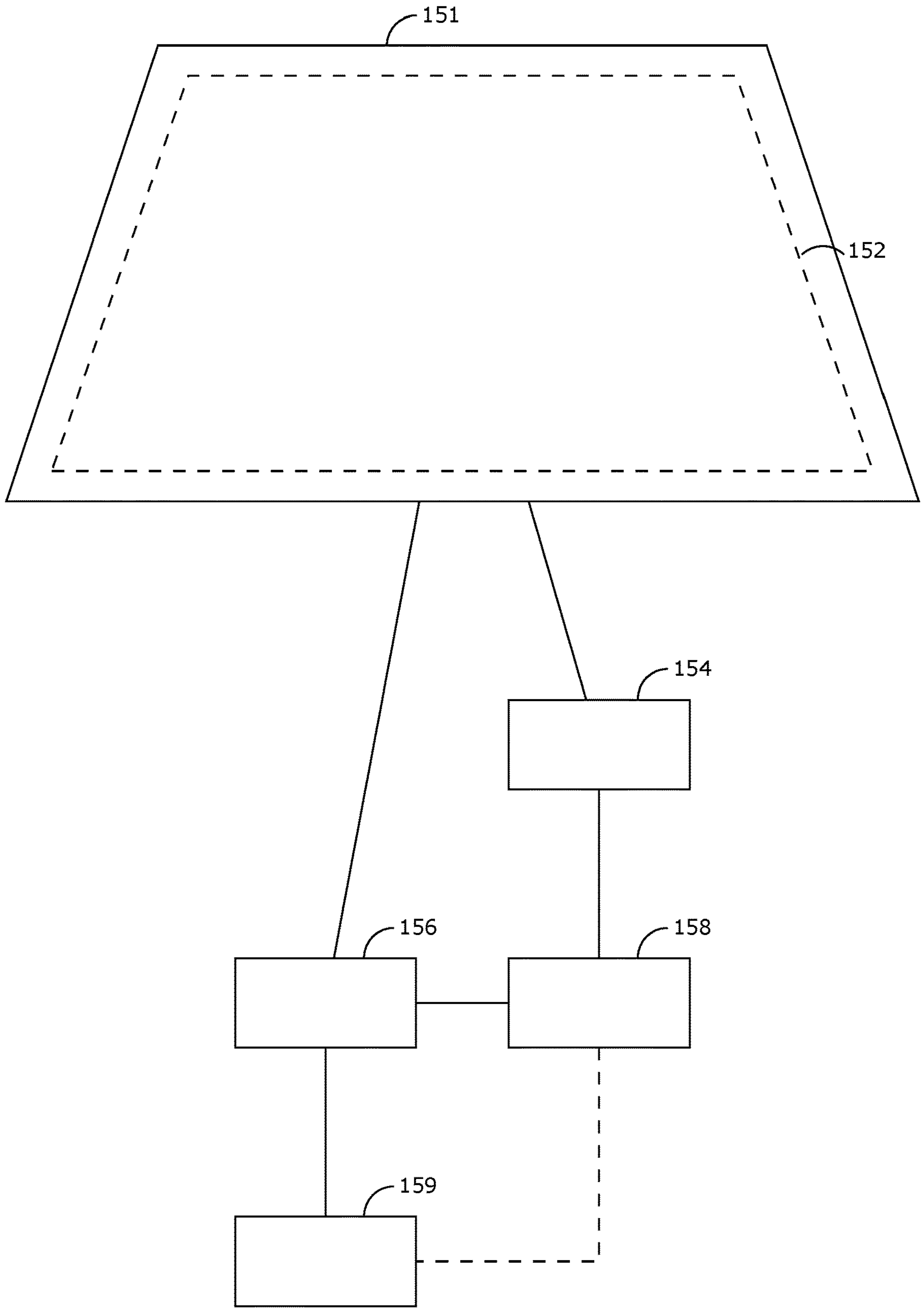
FIG. 6 is a view of a windshield with a high power deicing system and a proximity safety subsystem.

Turning to FIG. 6, there is a window 151 with a heating apparatus 152. Proximity sensor 154 is connected to the heating apparatus 152 and a switch 156 and a controller 158 attached to power source 159. When the proximity sensor 154 senses a large enough change in capacitance, the controller 158 trips the switch 156 and shuts down the high power deicing system, preventing injury.

As persons skilled in the art will realize, there are various configurations of switch 156 and controller 158 that can implement this functionality and fall within the scope of this description. For example, the switch could use solid state relays or mechanical relays or other electronic switches, and the controller could be programmed or hard wired. The proximity sensor can be a separate module, or built directly into the controller.

Figure 7:
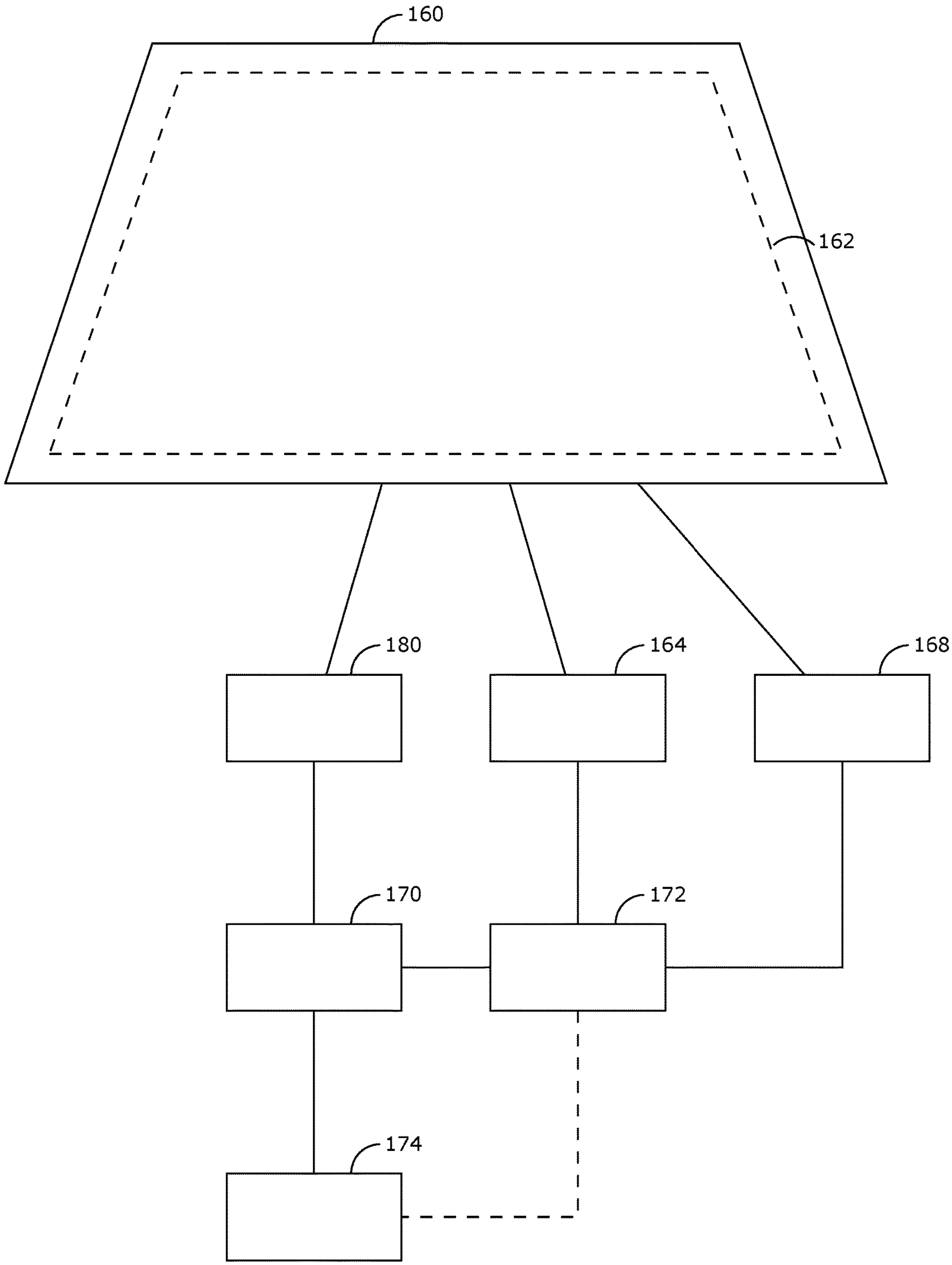
FIG. 7 is a view of a windshield with a high power deicing system and a proximity safety subsystem and a resistance safety subsystem.

FIG. 7 is a view of a windshield with a high power deicing system and a proximity safety subsystem and a resistance safety subsystem. Turning to FIG. 7, there is a window 160 with a heating apparatus 162. Proximity sensor 164, and resistance sensor 168 are all connected to the high power deicing system that includes heating apparatus 162. These are all connected to a switch 170 and a controller 172 attached to power source 174. When any of the sensors 164 or 168 detects a problem, controller 172 trips the switch 170 and shuts down the high power deicing system, preventing injury.

As persons skilled in the art will recognize, there are various types of proximity sensors that could be used to detect proximity of persons or objects to the windshield.

As persons skilled in the art will realize, there are various configurations of switch 170 and controller 172 that can implement this functionality and fall within the scope of this description. For example, the switch could use solid state relays or mechanical relays or other electronic switches, and the controller could be programmed or hard wired. The system could also utilize a fuse or circuit breaker 180.

The proximity based safety subsystem, the low power pulse combined with a proximity detector, is complementary to the resistor sensor safety subsystem since, in addition to detecting issues with the heating apparatus, the proximity subsystem can further prevent any form of human contact with the high power system. Additionally, if either subsystem is itself damaged, the other subsystem can act as a secondary layer of protection, preventing a dangerous situation. For example, damage that defeats the proximity detection subsystem may be detected by the resistance detection subsystem, and vice versa.

A person skilled in the art will realize that, while the description above generally relates to a method and heating system to deice a surface by heating the interface between the surface and a layer of ice and/or snow, the methods and systems described above can also be applied to defogging a surface by heating the surface.

The invention is not intended to be limited to the embodiments described herein, but rather the invention is intended to be applied widely within the scope of the inventive concept as defined in the specification as a whole including the appended claims.

What is claimed is:

1. A method of deicing a glass surface with increased safety using a high power heating system having a resistance across the heating system and having a capacitance across the heating system, comprising the steps of:
- applying heating energy to the glass surface using the heating system for a pre-determined duration in a first pulsed manner where the predetermined duration is sufficient to de-ice the glass surface, where the first pulsed manner comprises repeatedly applying a first pulse of power; and
- periodically applying a second pulse of power between the applications of the first pulse of power, where the second pulse of power is smaller in magnitude than the first pulse of power and the second pulse of power is applied 1-20 times per second;
- and using the second pulse of power to sense the resistance across the heating system, and stopping the method of heating the glass surface if the resistance is outside a predetermined range.

2. The method of claim 1, where the second pulse of power is applied before every application of high power in the first pulsed manner.

3. The method of claim 1, further comprising the steps of:
- using the second pulse of power to sense the capacitance across the heating system, and stopping the method of heating a glass surface if the capacitance is above a predetermined threshold.

4. The method of claim 1, further comprising the steps of:
- periodically applying a third pulse of power between the activations of the first pulse of power to sense the capacitance across the heating system, and stopping the method of heating the glass surface if the capacitance is above a predetermined threshold.

5. The method of claim 4, where the third pulse of power is applied 1-20 times per second.

6. The method of claim 5, where the third pulse of power is applied before every application of high power in the first pulsed manner.

7. A method of thermally modifying an interface between ice and an glass surface so as to de-ice the glass surface with increased safety using a heating system having a resistance across the heating system and having a capacitance across the heating system, comprising the steps of:

applying heating energy to the interface to melt an interfacial layer of ice for a duration in a first pulsed manner, where the first pulsed manner comprises repeatedly applying a first pulse of power having a magnitude;

where the duration is sufficient to de-ice the glass surface and the duration is limited so that the heating energy has a heat diffusion distance within the ice that extends no more than through the thickness of the interfacial layer of ice; and periodically applying a second pulse of power having a magnitude between the applications of the first pulse of power where the magnitude of the second pulse of power is smaller than the magnitude of the first pulse of power, and the second pulse of power is applied 1-20 times per second, and using the second pulse of power to sense the resistance across the heating system, and stopping the method of thermally modifying an interface if the sensed resistance is outside a predetermined range.

8. The method of claim 7, where the second pulse of power is applied before every application of high power in the first pulsed manner.

9. The method of claim 7, further comprising the steps of:

using the second pulse of power to sense the capacitance across the heating system, and stopping the method of thermally modifying an interface if the capacitance is above a predetermined threshold.

10. The method of claim 7, further comprising the steps of:

periodically applying a third pulse of power between the applications of the first pulse of power and using the third pulse of power to sense the capacitance across the heating system, and stopping the method of thermally modifying an interface if the capacitance is above a predetermined threshold.

11. The method of claim 10, where the third pulse of power is applied 1-20 times per second.

12. The method of claim 11, where the third pulse of power is applied before every application of high power in the first pulsed manner.

13. A system for heating a glass surface with increased safety, comprising:

a first power supply for generating power;

a heating apparatus that is within the glass surface or in contact with the glass surface and that is coupled to the first power supply, to convert the power into heat at the glass surface; and a first controller coupled to the first power supply configured to supply power to the heating apparatus in a first pulsed manner for a pre-determined duration where the duration is sufficient to deice the glass surface;

where the heating apparatus comprises at least a heating element and at least two busbars;

a second power supply for generating power coupled to a second controller and a resistance detector and configured to apply power of a smaller magnitude than a magnitude of the first pulse of power 1-20 times per second to the resistance detector at times interspersed between the first pulses of power;

the resistance detector being configured to measure resistance across the heating apparatus; and the resistance detector and first controller and first power supply being configured so that, if the resistance detected by the resistance detector is outside a predetermined range, power from the first power supply cannot be applied to the heating apparatus.

14. The system of claim 13, further comprising:

a capacitance detector configured to measure capacitance across the heating apparatus;

the second power supply for generating power being coupled to the second controller and the capacitance detector, and being configured to apply power of a smaller magnitude than the first pulse of power 1-20 times per second to the capacitance detector at times interspersed between the first pulses of power; and the capacitance detector and first controller and first power supply being configured so that, if the capacitance detected by the capacitance detector is outside a predetermined range, power from the first power supply cannot be applied to the heating apparatus.

15. A method of deicing a surface with increased safety using a high power heating system having a resistance across the heating system and having a capacitance across the heating system, comprising the steps of:

applying heating energy to the surface using the heating system for a pre-determined duration in a first pulsed manner where the duration is sufficient to de-ice the surface, where the first pulsed manner comprises repeatedly applying a first pulse of power; and periodically applying a second pulse of power between the applications of the first pulse of power, where the second pulse of power is smaller in magnitude than the first pulse of power and the second pulse of power is applied 1-20 times per second;

and using the second pulse of power to sense the resistance across the heating system, and stopping the method of heating a surface if the resistance is outside a predetermined range.

* * * * *